United States Patent
Moloney

(10) Patent No.: US 10,407,554 B2
(45) Date of Patent: Sep. 10, 2019

(54) POLYMERIC MATERIALS

(71) Applicant: COLORANT CHROMATICS AG, Cham (CH)

(72) Inventor: Steven John Moloney, St. Helens (GB)

(73) Assignee: COLORANT CHROMATICS AG, Cham (CH)

( * ) Notice: Subject to any disclaimer, the term of this patent is extended or adjusted under 35 U.S.C. 154(b) by 17 days.

(21) Appl. No.: 15/518,960

(22) PCT Filed: Oct. 15, 2015

(86) PCT No.: PCT/GB2015/053063
§ 371 (c)(1),
(2) Date: Apr. 13, 2017

(87) PCT Pub. No.: WO2016/063013
PCT Pub. Date: Apr. 28, 2016

(65) Prior Publication Data
US 2017/0233540 A1    Aug. 17, 2017

(30) Foreign Application Priority Data
Oct. 20, 2014 (GB) .................................. 1418604.3

(51) Int. Cl.
*C08J 5/18*   (2006.01)
*C08K 3/28*   (2006.01)
*C08K 3/22*   (2006.01)

(52) U.S. Cl.
CPC .................. *C08J 5/18* (2013.01); *C08K 3/22* (2013.01); *C08K 3/28* (2013.01); *C08J 2327/18* (2013.01); *C08J 2427/18* (2013.01); *C08K 2003/2258* (2013.01)

(58) Field of Classification Search
CPC ............................................................ C08J 5/18
See application file for complete search history.

(56) References Cited

U.S. PATENT DOCUMENTS

| | | | |
|---|---|---|---|
| 3,989,873 A | 11/1976 | Robertson | |
| 2006/0008640 A1 | 1/2006 | Chonan | |
| 2009/0275719 A1* | 11/2009 | Ishiguro | B32B 27/32 526/281 |
| 2010/0261037 A1* | 10/2010 | Fujita | C08J 3/226 428/702 |
| 2011/0318578 A1* | 12/2011 | Hashimoto | B32B 17/10 428/354 |

FOREIGN PATENT DOCUMENTS

| | | |
|---|---|---|
| EP | 0659845 A1 | 12/1994 |
| EP | 2206738 A1 | 7/2010 |
| EP | 2404752 A1 | 1/2012 |
| GB | 1544892 A | 4/1979 |
| JP | 2006045515 A | 2/2006 |
| JP | 2008024902 A | 2/2008 |
| JP | 2008222903 A | 9/2008 |
| JP | 2008291109 A | 12/2008 |
| JP | 2010-106181 | 5/2010 |
| WO | 2007114941 A2 | 10/2007 |
| WO | 2010101211 A1 | 9/2010 |

* cited by examiner

*Primary Examiner* — Arrie L Reuther
(74) *Attorney, Agent, or Firm* — Fay Sharpe LLP

(57) ABSTRACT

A film for use in architectural applications (e.g. for roofs, walls or windows of buildings) comprises a polymeric material and an additive, wherein said polymeric material is a fluoropolymer and said additive is selected from titanium-nitride and tungsten oxide. Preferred polymeric materials may be ethylene chlorotrifluoroethylene (ECTFE) or an ethylene-tetrafluoroethylene copolymer (ETFE).

19 Claims, No Drawings

POLYMERIC MATERIALS

This invention relates to polymeric materials and particularly, although not exclusively, relates to fluoropolymer, for example ethylene tetrafluoroethylene (ETFE), films.

It is known to use ETFE films in architectural applications (e.g. for roofs, walls or windows of buildings) due to its high strength and self-cleaning properties. However, if used in such architectural applications for buildings in regions having a hot climate, the inside of the building may be heated too much by transmission of infra-red (IR) through the ETFE film. This problem may be addressed by providing air-conditioning units inside of the building to cool the air therein. Alternatively, attempts may be made to attenuate the IR radiation and/or reduce its transmission through ETFE films. However, it is desirable that any means used to attenuate IR radiation does not significantly attenuate passage of visible light. This is because it is, of course, desirable to maximise the amount of natural light which may pass into a building incorporating such films. Furthermore, any means to attenuate radiation should not detrimentally affect the physical properties of the film or its low energy surface which leads to its self-cleaning properties. However, the aforementioned competing problems are challenging to solve in a way which is a cost-effective and practical.

It is an object of the present invention to address the above-described problems.

It is an object of the present invention to provide a film which addresses the above-described problems without significantly compromising other important properties of the film.

According to a first aspect of the invention, there is provided a film comprising a polymeric material (A) and an additive, wherein said polymeric material (A) is a fluoropolymer and said additive is selected from titanium nitride and tungsten oxide.

Said film preferably comprises one or more thermoplastic polymeric materials and said additive, wherein at least one thermoplastic polymeric material in said film is said polymeric material (A). The ratio defined as the wt % of polymeric material (A) in said film divided by the total wt % of all thermoplastic polymeric materials in said film is suitably at least 0.5, preferably at least 0.75, more preferably at least 0.9, especially at least 0.95.

The ratio defined as the wt % of fluoropolymers (e.g. having a repeat unit of Formula I as hereinafter described) in said film divided by the total wt % of all thermoplastic polymeric materials in said film is suitably at least 0.5, preferably at least 0.75, more preferably at least 0.9, especially at least 0.95.

Particles of said additive preferably do not protrude from a matrix defined, at least in part, by said polymeric material (A).

Said film suitably comprises at least 50 wt %, preferably at least 75 wt %, more preferably at least 90 wt %, especially at least 95 wt % of said polymeric material (A). Said film may comprise 80 to 120 parts by weight (pbw) of said polymeric material (A) and 0.2 to 5 pbw of said additive. In said film, a ratio defined as the wt % of said polymeric material (A) divided by the wt % of said additive may be in the range 10-1110, preferably in the range 20 to 700.

Said film may include at least 0.1 wt %, preferably at least 0.2 wt %, of said additive. It may include less than 3 wt % or less than 2 wt % of said additive.

Said film may have a thickness of at least 10 μm, preferably at least 100 μm or, more preferably, at least 150 μm. The thickness may be less than 1000 μm, preferably less than 500 μm, more preferably less than 350 μm.

Said polymeric material (A) is preferably a thermoplastic polymer. It is preferably saturated. Polymeric material (A) preferably includes a repeat unit (XI) which includes a moiety

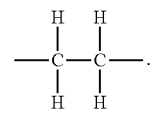

Preferably, said repeat unit (XI) is an ethylene repeat unit.

Said polymeric material (A) preferably includes a repeat unit (XII) which includes a moiety

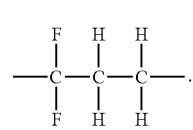

Said repeat unit (XI) may be a part of said repeat unit (XII).

Said polymeric material (A) preferably includes a repeat unit (XIII) which includes a moiety

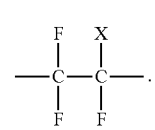

wherein X is a halogen atom, preferably selected from a chlorine and a fluorine atom. Preferably, X represents a fluorine atom.

Said polymeric material (A) preferably includes a repeat unit (XIV) which includes a moiety

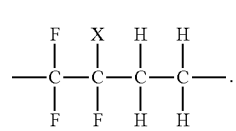

wherein X is as described above. Preferably, X represents a fluorine atom.

Said polymeric material (A) is preferably a copolymer which includes a repeat unit of formula I and a repeat unit of formula III.

In said polymeric material (A), the ratio of the mol % of moieties III divided by the mol % of moieties I is suitably in the range 0.25 to 4, preferably in the range 0.6 to 1.5, more preferably in the range 0.9 to 1.1.

Said polymeric material (A) may include at least 60 wt % of moieties of Formula III; and it may include less than 90 wt % of moieties of Formula III.

Said polymeric material (A) may include at least 10 wt % of moieties of Formula I; and it may include less than 40 wt % of moieties of Formula I.

Said polymeric material (A) may include at least 60 wt %, preferably at least 80 wt %, more preferably at least 95 wt %, especially at least 99 wt % of moieties of Formula IV.

Said polymeric material (A) may be ethylene chlorotrifluoroethylene (ECTFE) or an ethylene-tetrafluoroethylene copolymer (ETFE).

Said polymeric material (A) may have a specific gravity by DIN EN ISO 12086 in the range 1.5 to 1.9 g/cm$^3$.

Said polymeric material (A) may have a melt flow index (297° C./5 kg) by DIN EN ISO 1133 in the range 7-13 g/10 mins.

Said polymeric material (A) may have a melting point by DIN EN ISO 12086 of at least 220° C., preferably at least 240° C., more preferably at least 260° C. The melting point may be less than 300° C., preferably less than 280° C.

Said polymeric material (A) may have a tensile strength at break (23° C.) by DIN EN ISO 527-1 of at least 40 MPa, preferably at least 47 MPa. It may be less than 70 MPa.

Said polymeric material (A) may have an elongation at break (23° C.) by DIN EN ISO 527-1 of at least 350%, preferably at least 430%. It may be less than 600%.

Said polymeric material (A) may have a tensile modulus by DIN EN ISO 527-1 of at least 900 MPa, preferably at least 1100 MPa. It may be less than 1500 MPa.

Said polymeric material (A) may have a tear propagation resistance by DIN 53363 of at least 350 N/mm, preferably at least 450 N/mm. It may be less than 700 N/mm.

Said polymeric material (A) may have a light transmission at 550 nm based on a pure 100 µm film of polymeric material (A) of at least 85%, preferably at least 90%.

Said film could include a polymeric material (B) which is preferably a fluoropolymer. Polymeric material (B) is preferably a thermoplastic polymer. It is preferably saturated. Polymeric material (B) may have any feature of polymeric material (A) described. Thus, it may include moiety I, moiety II, moiety III and/or moiety IV; it is preferably an ethylene-tetrafluoroethylene copolymer (ETFE). Preferably, polymeric materials (A) and (B) include the same types of repeat units. In said polymeric material (B), the ratio of the mol % of moieties III divided by the mol % of moieties I is suitably in the range 0.25 to 4, preferably in the range 0.6 to 1.5, more preferably in the range 0.9 to 1.1. Said polymeric material (B) may include at least 60 wt % of moieties of Formula III; and it may include less than 90 wt % of moieties of Formula III. Said polymeric material (B) may include at least 10 wt % of moieties of Formula I; and it may include less than 40 wt % of moieties of Formula I. Said polymeric material (B) may include at least 60 wt %, preferably at least 80 wt %, more preferably at least 95 wt %, especially at least 99 wt % of moieties of Formula IV.

Polymeric material (B) preferably has specific gravity, melt flow index, melting point, tensile strength, tensile modulus, tear propagation resistance and light transmission as described for said polymeric material (A). Thus, polymeric materials (A) and (B) are preferably the same polymeric materials or are very similar.

Preferably, polymeric material (A) makes up at least 60 wt %, more preferably at least 80 wt %, especially at least 85 wt % of the total wt % of thermoplastic polymeric materials included in said film. In one embodiment, polymeric material (A) makes up 90 to 100 wt %, preferably 95 to 100 wt %, of the total wt % of thermoplastic polymeric materials in said film. In another embodiment, the total wt % of thermoplastic polymeric materials included in said film may be made up of 5-15 wt % of polymeric material (B). Thus, preferably, the total amount of thermoplastic polymeric materials included in said film is made up of 80 to 100 wt % of polymeric material (A) and 0 to 20 wt % of polymeric material (B). An example of inclusion of a polymeric material (B) is when the C88AXMB polymeric material is used as described in Example 4.

The sum of the wt % of all thermoplastic polymeric materials in the film and said additive is suitably at least 95 wt %, preferably at least 97 wt %, more preferably at least 99 wt %.

The sum of the wt % of all thermoplastic polymeric materials, titanium nitride and tungsten oxide in the film is suitably at least 95 wt %, preferably at least 97 wt %, more preferably at least 99 wt %.

The sum of the wt % of polymeric material (A) and said additive is preferably at least 80 wt %, more preferably at least 90 wt %.

The sum of the wt % of polymeric material (A), polymeric material (B) and said additive is preferably at least 95 wt %, preferably at least 97 wt %, more preferably at least 99 wt %.

Said film may include at least 50 parts per million (ppm), for example at least 85 ppm of said additive. Said film may include less than 5000 ppm or less than 3000 ppm of said additive.

In a first embodiment, wherein said additive is titanium nitride the sum of the wt % of polymeric material (A), and said titanium nitride is preferably at least 80 wt %, more preferably at least 90 wt %. The sum of the wt % of polymeric material (A), polymeric material (B) and said titanium nitride is preferably at least 95 wt %, preferably at least 97 wt %, more preferably at least 99 wt %.

When said additive is titanium nitride, said film may include at least 50 ppm, for example at least 85 ppm titanium nitride. Said film may include less than 500 ppm or less than 350 ppm titanium nitride.

In a second embodiment, wherein said additive is tungsten oxide, the sum of the wt % of polymeric material (A), and said tungsten oxide is preferably at least 80 wt %, more preferably at least 90 wt %. The sum of the wt % of polymeric material (A), polymeric material (B) and said tungsten oxide is preferably at least 95 wt %, preferably at least 97 wt %, more preferably at least 99 wt %.

When said additive is tungsten oxide, said film may include at least 250 ppm, preferably at least 500 ppm tungsten oxide. It may include less than 5000 ppm or less than 3000 ppm tungsten oxide.

Preferably, said additive is dispersed in the film. It is preferably dispersed throughout the film. Said film preferably comprises (especially consists essentially of) a homogenous mixture of said thermoplastic polymeric material (which includes polymeric material (A) and said additive).

Said additive is preferably in the form of particles which are dispersed throughout said film and/or in said polymeric material (A). Particles of said additive in said film suitably have a $d_{50}$ of less than 50 µm, preferably less than 25 µm, more preferably less than 10 µm and, especially, 5 µm or less. In some embodiments, said particles may have a $d_{50}$ of less than 2 µm. The $d_{50}$ of said particles may be greater than 10 nm, for example greater than 20 nm. The $d_{50}$ may be measured by Laser Diffraction as described herein.

Preferably, less than 5 vol %, less than 3 vol % or less than 1 vol % of said particles have a particle size measured as described herein of more than 100 µm or more than 5 µm. Suitably, less than 5 vol % of said particles have a particle size of more than 5 µm. Suitably, more than 5 vol %, preferably more than 25 vol %, more preferably more than 50 vol %, especially more than 75 vol % of said particles have a particle size of more than 20 nm.

The particle size distribution may be expressed by "span (S)," where S is calculated by the following equation:

$$S = (d_{90} - d_{10})/d_{50}$$

where $d_{90}$ represents a particle size in which 90% of the volume is composed of particles having a smaller diameter than the stated $d_{90}$; and $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value, and 50% of the volume is composed of particles having a diameter smaller than the stated $d_{50}$ value.

Particle size distributions of particles in which the span (S) is from 0.01 to 10, or from 0.01 to 5, or from 0.1 to 3, for example, may be preferred.

A size-ratio (SR) may be defined as:

SR = thickness of the film (in μm)/Maximum dimension (in μm) of largest particle of said additive in said film.

SR is suitably at least 5, is preferably at least 7, is more preferably at least 8 and, especially is at least 9. It may be less than 100 or less than 40.

Said tungsten oxide may be of general formula WOx where $2.2 \leq x \leq 2.999$, such as $2.65 \leq x \leq 2.95$. The tungsten oxide may be of general formula MxWyOz where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, such as $0.001 \leq x/y \leq 0.1$ and $2.2 \leq z/y \leq 2.999$, such as $2.65 \leq z/y \leq 2.95$. In some embodiments, where the tungsten is of the general formula MxWyOz, z/y is 2.72 or 2.9. A reference to 2.9 covers both 2.90 and 2.92.

Preferably, said tungsten oxide is of formula WOx where $2.2 \leq x \leq 2.999$, such as $2.65 \leq x \leq 2.95$ Such tungsten oxide has been found to be surprisingly advantageous.

Said tungsten oxide preferably comprises at least 70 wt %, at least 80 wt %, at least 90 wt %, at least 95 wt %, at least 99 wt % or, especially, about 100 wt % of WOx where $2.2 \leq x \leq 2.999$, such as $2.65 \leq x \leq 2.95$. Said tungsten oxide preferably comprises at least 70 wt %, at least 80 wt %, at least 90 wt %, at least 95 wt %, at least 99 wt % or, especially, about 100 wt % of WOx where $2.70 \leq x \leq 2.90$.

Titanium nitride is known for having a stoichiometry in the range $TiN_{0.42}$ to $TiN_{1.16}$, but, most commonly, there is a one-to-one correspondence between the numbers of titanium and nitride atoms. When said additive is titanium nitride, said titanium nitride in said film preferably includes at least 74 wt %, preferably at least 77 wt % of titanium moieties Said titanium nitride in said film preferably includes less than 90 wt %, preferably less than 80 wt % of titanium moieties. Said titanium nitride in said film preferably includes at least 10 wt %, more preferably at least 20 wt % of nitrogen moieties. Said titanium nitride in said film preferably includes 26 wt % or less, more preferably 23 wt % or less of nitrogen moieties. Preferably, said titanium nitride in the film includes 75 to 79 wt % (especially 76 to 78 wt %) titanium moieties and 21 to 25 wt % (especially 22 to 24 wt %) of nitrogen moieties.

The film may be part of a building. Said film may have an area of at least 1 m², preferably at least 5 m². Said film preferably defines a part of a roof, wall or window of a building.

According to a second aspect of the invention, there is provided a method of making a film according to the first aspect, the method comprising:

(i) selecting a formulation (A) comprising an additive selected from titanium nitride and tungsten oxide;

(ii) contacting said formulation (A) with a polymeric material (A) which is a fluoropolymer; and (iii) melt-processing said formulation (A) and polymeric material (A) to produce said film.

Said polymeric material (A) of the second aspect may have any feature of polymeric material (A) of the first aspect.

Said film of the second aspect may have any feature of the film of the first aspect.

Said additive of the second aspect may have any feature of the additive of the first aspect.

Said formulation (A) selected in step (i) may be a liquid formulation or a solid formulation, for example a masterbatch.

Formulation (A) is preferably a solid masterbatch.

Said formulation (A) of the second aspect may include at least 1000 ppm or at least 2000 ppm of said additive. It may include less than 20,000 ppm of said additive.

Preferably, the wt % of said additive in said formulation (A) is greater than the wt % of said additive in the film made in the method. In this case, said formulation (A) may include at least 0.05 wt %, preferably at least 0.10 wt %, especially at least 0.15 wt % of said additive. It may include less than 2 wt % of said additive. Said formulation (A) is preferably a solid masterbatch. Said formulation (A) suitably includes a thermoplastic polymeric material. Formulation (A) suitably includes at least 90 wt %, preferably at least 95 wt %, especially at least 98 wt % of thermoplastic polymer. Said formulation (A) preferably includes a polymeric material (C) which is a fluoropolymer.

Said polymeric material (C) is preferably a thermoplastic polymer. It is preferably saturated. Polymeric material (C) preferably includes a repeat unit (XI) which includes a moiety

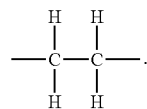

Preferably, said repeat unit (XI) is an ethylene repeat unit.

Said polymeric material (C) preferably includes a repeat unit (XII) which includes a moiety

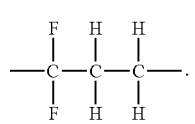

Said repeat unit (XI) may be a part of said repeat unit (XII).

Said polymeric material (C) preferably includes a repeat unit (XIII) which includes a moiety

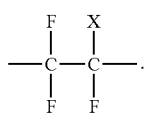

wherein X is a halogen atom, preferably selected from a chlorine and a fluorine atom. Preferably, X represents a fluorine atom.

Said polymeric material (C) preferably includes a repeat unit (XIV) which includes a moiety

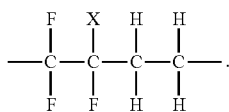

wherein X is as described above. Preferably, X represents a fluorine atom.

Said polymeric material (C) is preferably a copolymer which includes a repeat unit of formula I and a repeat unit of formula III.

In said polymeric material (C), the ratio of the mol % of moieties III divided by the mol % of moieties I is suitably in the range 0.25 to 4, preferably in the range 0.6 to 1.5, more preferably in the range 0.9 to 1.1

Said polymeric material (C) may include at least 60 wt % of moieties of Formula III; and it may include less than 90 wt % of moieties of Formula III.

Said polymeric material (C) may include at least 10 wt % of moieties of Formula I; and it may include less than 40 wt % of moieties of Formula I.

Said polymeric material (C) may include at least 60 wt %, preferably at least 80 wt %, more preferably at least 95 wt %, especially at least 99 wt % of moieties of Formula IV.

Said polymeric material polymer (C) may be ethylenechlorotrifluoroethylene (ECTFE) or an ethylene-tetrafluoroethylene copolymer (ETFE).

Polymeric material (C) preferably has specific gravity, melt flow index, melting point, tensile strength, tensile modulus, tear propagation resistance and light transmission as described for said polymeric material (A). Preferably, polymeric materials (A) and (C) are identical. They are preferably exactly the same polymeric material.

In step (iii) of the method, melt-processing is suitably undertaken in an extruder and a film produced by standard techniques.

According to a third aspect of the invention there is provided a method of making a formulation (A) according to the second aspect, the method comprising:

(i) selecting a liquid formulation (B) comprising a carrier and an additive selected from titanium nitride and tungsten oxide;

(ii) contacting said liquid formulation (B) with a polymeric material (C) which is a fluoropolymer;

(iii) melt-processing said liquid formulation with said polymeric material (C).

Said polymeric material (C) of the third aspect may have any feature of polymeric material (C) of the second aspect.

Said additive of the third aspect may have any feature of the additive of the first and/or second aspects. In said liquid formulation (B), preferably at least 90 wt % of particles of said additive are present as primary particles—i.e. particles of said additive are generally not agglomerated.

Said liquid formulation (B) may include at least 10 wt %, preferably at least 14 wt % of additive; it may include less than 50 wt % of said additive.

Said liquid formulation (B) may include up to 90 wt %, for example up to 86 wt %, of carrier; and it suitably includes at least 50 wt % carrier. Said carrier is suitably a liquid (at 25° C. and atmospheric pressure); it may be a vegetable or mineral oil or a glycol. A particularly preferred glycol is ethylene glycol.

Said carrier may have a boiling point of less than the maximum temperature said polymeric material (C) is subjected to in step (iii) of the process. Said carrier may have a boiling point which is at least 10° C. less than the maximum temperature said polymeric material (C) is subjected to in step (iii) of the process.

Said carrier may have a boiling point of less than 330° C., preferably less than 320° C., more preferably less than 310° C., especially less than 250° C.

In step (ii), liquid formulation (B) and polymeric material (C) may be contacted when both components are at a temperature of less than 50° C., for example at ambient temperature. Step (ii) suitably involves mixing liquid formulation (B) and polymeric material (C).

In step (iii), melt-processing may be undertaken in an extruder. The maximum temperature to which liquid formulation (B) and polymeric material (C) are subjected in the extruder may be less than 330° C., for example less than 320° C. The maximum temperature may be less (e.g. by at least 10° C. or at least 20° C.) than the maximum temperature attained during extrusion in step (iii) of the method of the second aspect.

In the method of the third aspect, carrier may be removed from the polymeric material in step (iii) or subsequent thereto. For example, carrier may be vented off during melt-processing.

The method preferably comprises producing (and said formulation (A) preferably comprises) a solid, for example pellets, comprising said polymeric material (C) and said additive. Said solid preferably includes less than 5 wt %, for example less than 1 wt % of said carrier. After said method, said formulation (A) may be as described in the second aspect.

According to a fourth aspect of the invention, there is provided a formulation (A) as described in the second and/or third aspects per se. Said formulation preferably comprises a polymeric material (C) which is a fluoropolymer and an additive selected from titanium nitride and tungsten oxide.

Polymeric material (C) is preferably as described in the second aspect. Said additive, said titanium nitride and said tungsten oxide are preferably as described in the first, second and/or third aspects.

In a preferred embodiment, said formulation (A) is in a solid (e.g. pellet) form and comprises particles of said additive comprising titanium nitride or tungsten oxide dispersed throughout said polymeric material (C). Said polymeric material (C) is preferably as described above and, more preferably, includes a structure of Formula IV. It is preferably an ethylene-tetrafluoroethylene copolymer (i.e. preferably an ETFE). Said formulation (A) preferably includes at least 0.05 wt %, especially at least 0.15 wt % of said additive and may include less than 2 wt % of said additive. Said formulation (A) preferably includes at least 90 wt %, more preferably at least 95 wt %, especially at least 98 wt % of polymeric material (C). It may include less than 99 wt % of polymeric material (C).

In a fifth aspect, there is provided a method of constructing a building, the method comprising the steps of:
(i) selecting a film according to the first aspect;
(ii) securing the film between at least two supports to define a part of the building. Said part of the building may be a roof, wall or window of the building.

The invention extends to the use of a film of the first aspect in or on a building for reducing the amount of IR radiation which passes into the building.

Specific embodiments of the invention will now be described by way of example.

The following materials are referred to hereinafter.

Titanium nitride—refers to titanium nitride, with nanometer average primary particle sizes.

Tungsten oxide—refers to particulate $WO_{2.72}$ of less than 2 μm.

ETFE 6235—refers to Dyneon (Trade Mark) ETFE which is a partially fluorinated copolymer comprising tetraflouroethylene and ethylene designed for film extrusion. It has a melting point of 266° C. (DIN ES ISO 12086) and a Melt Flow Index of 10 g/10 mins (DIN EN ISO 1133).

C88AXMP—ETFE in pellet form from AGC Chemicals.

Unless otherwise stated, the particle sizes described herein were examined using a Beckman Coulter LS230 Laser Diffraction Particle Size Analyzer, fitted with a Micro Volume Module filled with dichloromethane. The samples were pre-diluted in mineral oil before addition to the module.

In the following, Examples 1 and 2 describe preparation of liquid formulations for use in preparing solid masterbatches; Examples 3 and 4 describe the preparation of solid masterbatches; Examples 5 to 10 describe preparation of films using the masterbatches; and Example 11 describe assessments undertaken on the films.

EXAMPLE 1—PREPARATION OF LIQUID FORMULATION COMPRISING TITANIUM NITRIDE

Titanium nitride (15 wt %) as described was slowly added with constant stirring to ethylene glycol (85 wt %). After the solid titanium nitride had been added, the mixer speed was increased to produce a smooth vortex and the speed of the mixer was maintained at the increased level until the solids had been fully dispersed. The dispersion was then transferred to a bead mill and milled until the titanium nitride had been milled to the desired particle size and agglomerates had been broken down.

The particle size; measured by transmission electron microscopy (TEM) was 20 nm.

EXAMPLE 2—PREPARATION OF LIQUID FORMULATION COMPRISING TUNGSTEN OXIDE

Milled Tungsten oxide (40 wt %) of particle size less than 2 μm as described was slowly added with constant stirring as described in Example 1 to ethylene glycol (60 wt %) and the solids were fully dispersed as described in Example 1. The particle size, measured by Laser Diffraction was <2 μm.

EXAMPLE 3—PREPARATION OF MASTERBATCH COMPRISING TITANIUM NITRIDE

The liquid formulation of Example 1 (1.28 wt %) was blended with a mixture of dry polymer pellets of ETFE 6235 and C88AXMB powder to produce polymer/liquid IR absorber pre-mix.

The blended composition was fed into a twin-screw extruder to melt the ETFE polymer and disperse particles of titanium nitride in the polymer matrix. Additionally, in the extruder, the ethylene glycol is vented off. On exit from the extruder, the composition is cooled and pelletised.

The pelletised blend was characterised using MFI and Lab* colour values and results are provided in Table 1. For comparison purposes, Example C1 quoted in Table 1 is ETFE6235 in the absence of titanium nitride.

TABLE 1

| Characteristic | Example C1 | Example 3 | Example 4 |
|---|---|---|---|
| MFI - 5 kg/297° C. | 10 | 9.48 | 10.24 |
| L* | 96.82 | 35.08 | 31.65 |
| a* | 0.07 | −2.89 | −11.95 |
| b* | 1.28 | −11.61 | −0.91 |

From the colour data, it can be seen that the addition of the titanium nitride in the masterbatch makes the masterbatch much darker than the original resin. In the case of the MFI, it remains relatively unaffected by the addition of the liquid IR absorber additive indicating that the carrier liquid is not acting as a plasticiser and does not affect the rheology of the polymer, indicating successful removal of the liquid component.

EXAMPLE 4—PREPARATION OF MASTERBATCH COMPRISING TUNGSTEN OXIDE

The procedure of Example 3 was generally followed by blending ETFE6235 (87.27 wt %), C88AXMB Ashai beads (9.18 wt %) and the liquid formulation of Example 2 (3.55 wt %). The output of the extruder was pelletized and the pelletised blend characterised as described in Example 3. Results are recorded in Table 1. As for Example 3, oxide in the masterbatch makes the masterbatch darker compared to the original resin, but the MFI is substantially unaffected indicating that the carrier liquid has not plasticised the polymer or otherwise affected its rheology.

EXAMPLES 5 TO 10—PREPARATION OF FILMS COMPRISING MASTERBATCHES OF EXAMPLES 3 AND 4

The masterbatches of Examples 3 and 4 were mixed with ETFE6235 polymer in various proportions and extruded using a single screw extruder fitted with a film die to produce films of 200 μm thickness.

A summary of the components used to make the films is provided in Table 2. All amounts in the table are wt %.

TABLE 2

| | Example C1 | Example 5 | Example 6 | Example 7 | Example 8 | Example 9 | Example 10 |
|---|---|---|---|---|---|---|---|
| ETFE6235 | 100 | 95 | 90 | 85 | 95 | 90 | 85 |
| Example 3 | — | 5 | 10 | 15 | — | — | — |
| Example 4 | — | — | — | — | 5 | 10 | 15 |

EXAMPLE 11—ASSESSMENT OF FILMS

The films produced (examples 5-10) were measured for transmittance using a UV-VIS-NIR spectrophotometer and the percentage reduction in IR transmittance measured at 700, 800, 900 and 1000 nm to illustrate the reduction (%) in IR transmittance (i.e. IR absorption). The colours of the films produced was also measured and is reported as Lab* values (L*, a*, b* and ΔE* compared to example C1). Results are provided in Table 3.

TABLE 3

| Example No. | 700 nm | 800 nm | 900 nm | 1000 nm | L* | a* | b* | ΔE* |
|---|---|---|---|---|---|---|---|---|
| C1 | N/A | N/A | N/A | N/A | 96.82 | 0.07 | 1.28 | N/A |
| 5 | 23.27 | 21.10 | 16.14 | 8.74 | 90.23 | −0.03 | 1.51 | 6.59 |
| 6 | 29.91 | 28.46 | 24.23 | 17.40 | 87.94 | −0.36 | 0.72 | 8.9 |
| 7 | 38.47 | 37.28 | 33.68 | 27.52 | 84.23 | −0.68 | 0.03 | 12.68 |
| 8 | 31.06 | 33.47 | 33.49 | 30.45 | 88.95 | −1.39 | 1.9 | 8.03 |
| 9 | 45.18 | 48.40 | 51.61 | 50.76 | 83.7 | −2.62 | 2.14 | 13.42 |
| 10 | 52.38 | 55.47 | 59.49 | 59.05 | 81.97 | −2.82 | 1.98 | 15.14 |

In comparison to the un-modified polymer materials (Example C5), it can be seen that by adding increasing quantities of the masterbatch Example 3 (i.e. Examples 5-7) that there is a reduction in the IR transmittance at the designated wavelengths and that this IR absorption effect increases as the quantity of the masterbatch of Example 3 is increased. Conversely as the IR absorbing effect increases the material does become darker but the transparency of the film is retained. Examples 8-10 based on the addition of the 5-7 with the exception that the IR absorbing effect is increased. Example 8-10 do become darker as the proportion of masterbatch of Example 4 is added but again the material transparency is retained.

Thus, advantageously, use of the masterbatches described, allows films to be produced which, when used on the outside of buildings (e.g. as parts of roofs or walls), allow significant visible light transmission into the building whilst limiting IR transmission into the building.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A film comprising a polymeric material (A) and an additive, wherein said polymeric material (A) is a fluoropolymer and said additive is selected from titanium nitride and tungsten oxide, wherein said film is part of a building and said polymeric material (A) includes a structure:

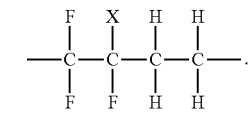

wherein X is a halogen atom; said film having a thickness of at least 10 μm; wherein when said additive is titanium nitride, said film includes at least 50 ppm and less than 500 ppm of the titanium nitride, and when said additive is tungsten oxide, said film includes at least 250 ppm and less than 3,000 ppm of the tungsten oxide; and wherein said tungsten oxide is of a formula WOx, wherein 2.65≤x≤2.95.

2. A film according to claim 1, wherein the ratio defined as the wt % of fluoropolymers in said film divided by the total wt % of all thermoplastic polymeric materials in said film is at least 0.95.

3. A film according to claim 1, wherein said polymeric material (A) further comprises a moiety

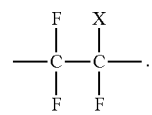

wherein X is a fluorine atom.

4. A film according to claim 3, wherein said polymeric material (A) includes at least 60 wt % of moieties of Formula III; and includes less than 90 wt % of moieties of Formula III.

5. A film according to claim 1, wherein said polymeric material (A) is an ethylene-tetrafluoroethylene copolymer.

6. A film according to claim 1, wherein said polymeric material (A) makes up at least 60 wt % of the total wt % of thermoplastic polymeric materials included in said film.

7. A film according to claim 1, wherein the sum of the wt % of all thermoplastic polymeric materials, titanium nitride and tungsten oxide in the film is at least 99 wt %.

8. A film according to claim 1, wherein said additive is titanium nitride and the sum of the wt % of polymeric material (A) and said titanium nitride in said film is at least 80 wt %.

9. A film according to claim 1, wherein said additive is tungsten oxide and the sum of the wt % of polymeric material (A) and said tungsten oxide is at least 80 wt %.

10. A film according to claim 1, wherein said additive is in the form of particles which are dispersed throughout said film and/or in said polymeric material (A), wherein said particles of said additive in said film have a $d_{50}$ of less than 50 μm and greater than 10 nm measured by Laser Diffraction.

11. A film according to claim 1, wherein a size-ratio (SR) is defined as:

SR=thickness of the film (in μm)/Maximum dimension (in μm) of largest particle of said additive in said film wherein SR is at least 5 and is less than 100.

12. A method of making a film according to claim 1, the method comprising:
   (i) selecting a formulation (A) comprising an additive selected from titanium nitride and tungsten oxide, wherein said formulation (A) includes at least 50 ppm of said titanium nitride or at least 1000 ppm of said tungsten oxide additive, wherein said formulation (A) includes a polymeric material (C) which is a fluoropolymer and wherein said formulation (A) is a solid masterbatch;
   (ii) contacting said formulation (A) with a polymeric material (A) which is a fluoropolymer; and
   (iii) melt-processing said formulation (A) and polymeric material (A) to produce said film.

13. A film according to claim 1, wherein the ratio defined as the wt % of fluoropolymers in said film divided by the total wt % of all thermoplastic polymeric materials in said film is at least 0.95;
   wherein said polymeric material (A) is an ethylene-tetrafluoroethylene copolymer;
   wherein said polymeric material (A) makes up at least 85 wt % of the total wt % of thermoplastic polymeric materials included in said film;
   wherein the sum of the wt % of all thermoplastic polymeric materials, titanium nitride and tungsten oxide in the film is at least 99 wt %.

14. A film according to claim 13, wherein a size-ratio (SR) is defined as:

SR=thickness of the film (in μm)/maximum dimension (in μm) of largest particle of said additive in said film, wherein SR is at least 5 and is less than 100; and
wherein said additive is in the form of particles which are dispersed throughout said film and/or in said polymeric material (A), wherein said particles of said additive in said film have a $d_{50}$ of less than 50 μm and greater than 10 nm, measured by Laser Diffraction.

15. A film according to claim 13, wherein said additive is titanium nitride and the sum of the wt % of polymeric material (A) and said titanium nitride in said film is at least 80 wt %, and said film includes at least 85 ppm of titanium nitride.

16. A film according to claim 13, wherein said film is part of a building, said additive is tungsten oxide and the sum of the wt % of polymeric material (A) and said tungsten oxide is at least 80 wt % and said film includes at least 500 ppm tungsten oxide.

17. A film according to claim 1, wherein said film has a thickness of at least 150/cm and said thickness is less than 350/m; and wherein the sum of the wt % of all thermoplastic polymeric materials, titanium nitride and tungsten oxide in the film is at least 99 wt %.

18. A film according to claim 1, wherein X is a fluorine atom.

19. A method of making a formulation (A) wherein said formulation (A) comprises an additive selected from titanium nitride and tungsten oxide, wherein said formulation (A) includes at least 1000 ppm of said additive, wherein said formulation (A) includes a polymeric material (C) which is a fluoropolymer and wherein said formulation (A) is a solid masterbatch, the method comprising:
   (i) selecting a liquid formulation (B) comprising a carrier and an additive selected from titanium nitride and tungsten oxide, wherein said liquid formulation (B) includes at least 10 wt % and less than 50 wt % of said additive and said liquid formulation (B) includes at least 50 wt % carrier and up to 90 wt % carrier, wherein said carrier has a boiling point of less than 330° C.;
   (ii) contacting said liquid formulation (B) with a polymeric material (C) which is a fluoropolymer;
   (iii) melt-processing said liquid formulation (B) with said polymeric material (C) wherein carrier is vented off during melt-processing and wherein said method comprises producing pellets comprising said polymeric material (C) and said additive.

* * * * *